(12) United States Patent
Leith

(10) Patent No.: US 6,412,366 B1
(45) Date of Patent: Jul. 2, 2002

(54) ENGINE COUNTERWEIGHT

(75) Inventor: Donald G. Leith, 7114 S. Edler Ct., West Bloomfield, MI (US) 38324

(73) Assignee: Donald G. Leith, Wixom, MI (US)

( * ) Notice: Subject to any disclaimer, the term of this patent is extended or adjusted under 35 U.S.C. 154(b) by 0 days.

(21) Appl. No.: 09/609,491

(22) Filed: Jul. 5, 2000

(51) Int. Cl.⁷ .............................. F16C 3/04; F16F 15/22
(52) U.S. Cl. .............................. 74/603; 74/595; 74/604; 74/573 R
(58) Field of Search ................. 74/595–604, 573 R, 74/574; 310/153; 164/98

(56) References Cited

U.S. PATENT DOCUMENTS

| | | | | |
|---|---|---|---|---|
| 1,259,086 A | * | 3/1918 | Dunn .......................... | 74/603 |
| 3,587,343 A | * | 6/1971 | Heinz ........................... | 74/603 |
| 4,594,917 A | * | 6/1986 | Ziegler ................... | 74/573 R X |
| 4,980,592 A | * | 12/1990 | Olmr et al. ................. | 310/153 |
| 5,473,369 A | * | 12/1995 | Fowlkes et al. ...... | 74/573 R X |
| 5,899,120 A | * | 5/1999 | Leith ........................... | 74/603 |
| 5,931,051 A | * | 8/1999 | Ott .............................. | 74/603 X |
| 6,032,635 A | * | 3/2000 | Moorman et al. ...... | 123/196 R |
| 6,135,727 A | * | 10/2000 | Dreiman et al. .......... | 74/603 X |
| 2001/0004929 A1 | * | 6/2001 | Leith et al. .................... | 164/98 |

FOREIGN PATENT DOCUMENTS

DE          10033974 A1  *  3/2001  .................. 74/603

* cited by examiner

Primary Examiner—Vinh T. Luong
(74) Attorney, Agent, or Firm—Gifford, Krass, Groh, Sprinkle, Anderson & Citkowski, P.C.

(57) ABSTRACT

An improved counterweight for a crankshaft having a main body which is adapted to rotate about a predetermined axis. The main body includes a major lobe on one side of the axis and a diametrically opposed minor lobe. Two recessed surfaces extend on opposite sides of a diametric line bisecting the major and minor lobes so that the recessed surface forms a portion of the outer periphery of the crankshaft. A pair of inserts is provided and each insert has a surface complementary to one of the recessed surfaces on the main body. Each insert is inserted into the main body to form a generally cylindrical counterweight.

5 Claims, 3 Drawing Sheets

ENGINE COUNTERWEIGHT

BACKGROUND OF THE INVENTION

I. Field of the Invention

The present invention relates generally to counterweights for piston engines and compressors (hereinafter collectively referred to as "engines").

II. Description of the Prior Art

The previously known counterweights for engines typically comprise a main body adapted to rotate about a predetermined axis. The main body includes a major lobe on one side of the axis of rotation and a diametrically opposed minor lobe on the opposite side of the axis of rotation. The volume of the major lobe is greater than the volume of the minor lobe to offset the weight of the engine piston.

It is well known, however, that the reduction of volume in the crankcase for the engine effectively reduces engine emissions and increases power output for the engine. Consequently, there have been a number of previously known attempts to construct counterweights which are cylindrical in shape and yet provide the counterweight function.

For example, in one prior art device, plastic inserts are provided on opposite sides of a diametric line bisecting the major and minor lobes of the main body of the counterweight. These inserts are constructed of a lightweight material, such as plastic, so that, with the inserts positioned against the main body of the counterweight, the counterweight assumes a generally cylindrical overall shape. In order to retain the inserts to the main body of the counterweight during rotation of the counterweight, a metal cup is positioned around the counterweight which encases both the main body of the counterweight as well as the inserts. After the inserts are positioned within the metal cup and thus against the main body of the counterweight, the outer edge of the main cup is bent over the outer periphery of both the main body of the counterweight as well as the outer periphery of the inserts thus attaching the inserts to the main body.

While this previously known device has effectively reduced the volume of the crankcase, it has not proven wholly satisfactory for a number of reasons.

One primary disadvantage of this previously known counterweight is that the additional cost of the metal retaining cup for the inserts as well as the manufacturing operation to roll or bend the outer periphery of the retaining cup over the insert unduly increases the overall cost of the crankshaft.

SUMMARY OF THE PRESENT INVENTION

The present invention provides a counterweight which overcomes the above-mentioned disadvantages of the previously known devices.

In brief, the present invention provides a counterweight having a main body which is adapted to rotate about a predetermined axis. The main body includes a major lobe on one side of the axis of rotation and a diametrically opposed minor lobe on the opposite side of the axis of rotation. This minor lobe is adapted for connection with the engine crankpin. Furthermore, the major lobe has a greater volume than the minor lobe and, as such, weighs more than the minor lobe.

The main body further includes two recessed surfaces so that one recessed surface is positioned on each opposite side of a diametric line bisecting the major and minor lobes. Consequently, each recessed surface forms a portion of the outer periphery for both the major and minor lobes.

The counterweight of the present invention further comprises at least one insert which is constructed of a material which is less dense than the material forming the main body for the counterweight. Preferably, the inserts are constructed of plastic while the main body is constructed of metal.

Each insert includes a first surface complementary to at least one of the recessed surfaces on the main body. With the surfaces of the inserts positioned in abutment with the recessed surfaces of the main body, the overall shape of the counterweight is generally cylindrical and solid.

In one embodiment of the invention, two inserts are provided. In order to attach the inserts to the main body, each insert includes a locking tab which protrudes outwardly from its first surface and is received within a like shaped locking recess formed in the recessed surface of the main body. Preferably, the locking tabs are T-shaped in cross section although other shapes may alternatively be used without deviation from the spirit or scope of the invention. Similarly, the locking tabs may alternatively protrude outwardly from the main body and are received in recesses formed in the plastic inserts. The inserts may be press fit onto the main body so that the locking tabs are press fit into the receiving locking recesses. Alternatively, the inserts may be positioned within a generally cylindrical mold and the mold is then filled with a liquid metal. In doing so, the liquid metal encapsulates (or forms) the locking tabs so that, upon solidification of the metal, the metal not only forms the main body for the counterweight but also locks the inserts to the main body.

In yet another preferred embodiment of the present invention, the main body is additionally comprised of a ring and backing, both formed together with the major and minor lobes. Plastic is then formed and inserted into the recesses in the main body.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
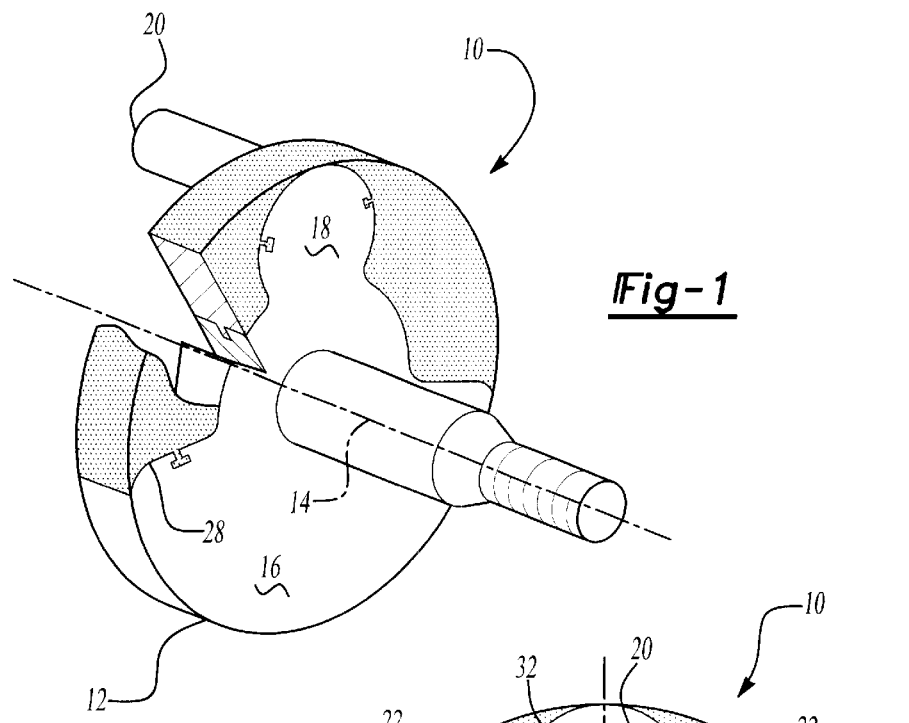
FIG. 1 is a fragmentary elevational view illustrating a preferred embodiment of the present invention.
Figure 2:
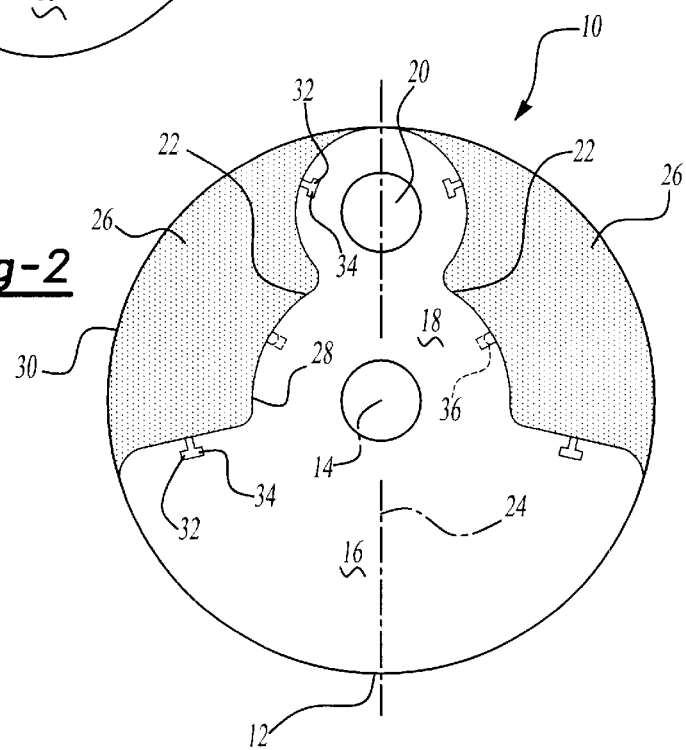
FIG. 2 is a front view illustrating the preferred embodiment of the invention.

With reference first to FIGS. 1 and 2, a first preferred embodiment of the crankshaft 10 of the present invention is there shown and comprises a main body 12 adapted to rotate about a predetermined axis of rotation 14. The main body 12 includes a major lobe 16 on one side of the axis 14 of rotation and a diametrically opposed minor lobe 18 on the opposite side of the axis of rotation 14. This minor lobe 18 is adapted for connection with a crankpin 20.

The minor lobe 18 has a smaller volume than the major lobe 16. Consequently, the main body 12 includes two substantially identical recessed surfaces 22 on opposite sides of a diametric line 24 (FIG. 2) bisecting the major lobe 16 and minor lobe 18. Thus, each recessed surface 22 forms a portion of the outer periphery of both the major lobe 16 and minor lobe 18.

Still referring to FIGS. 1 and 2, the counterweight 10 further comprises a pair of inserts 26 which are substantially identical to each other. Therefore, only one insert 26 will be described in detail, it being understood that a like description shall apply to the other insert 26.

The insert 26 includes a first surface 28 which is complementary to the recessed surface 22. As such, the first surface 28 of the insert 26 flatly abuts against the recessed surface 22 as shown in FIG. 2. Conversely, a second or outer surface 30 of the insert 26 is generally circular in shape. Consequently, with the inserts 26 positioned against the main body 12 as shown in FIGS. 1 and 2, the overall shape of the counterweight 10 is substantially cylindrical.

In order to secure the inserts 26 to the main body 12, the insert 26 includes at least one, and preferably several locking tabs 32 (FIG. 2) which protrude outwardly from its first surface 28. These locking tabs 32 are received within like shaped locking recesses 34 formed in the recessed surface 22 of the counterweight main body 12. As shown in the drawing, the locking tabs 32 are preferably T-shaped in cross section although the locking tabs 32 may be of other shapes and configuration without deviation from the spirit or scope of the invention. Similarly, the locking tabs and recesses may be reversed, i.e. the locking tabs protrude outwardly from the recessed surface 22 of the main body 12 and are received within like shaped locking recesses formed in the inserts 26.

The density of the inserts 26 is less than the density of the main body 12 so that the overall counterweight 10 maintains its counterweight function. In the preferred embodiment of the invention, the main body 12 is constructed of metal while the inserts 26 are constructed of plastic or other lightweight material.

In order to position the locking tabs 32 within the locking recesses 34, the inserts 26 may be axially press fit onto the main body of the counterweight 12. In order to prevent axial displacement of the inserts 26 once press fit onto the main body 12, each counterweight 26 may include a central locking node 36 which is received within a recess on the main body 12.

Figure 3:
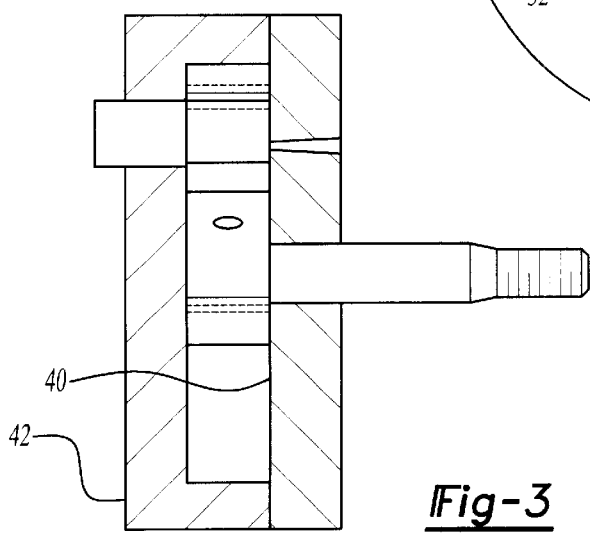
FIG. 3 is a transverse partial sectional view illustrating the method of manufacturing one preferred embodiment of the present invention.
Figure 4:
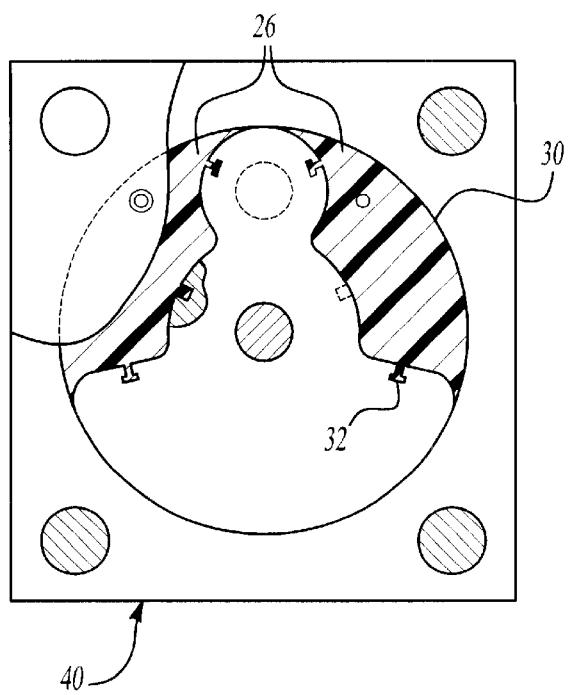
FIG. 4 is a front plan view illustrating the method of manufacturing the first preferred embodiment of the invention.

With reference now to FIGS. 3 and 4, a second means of constructing the counterweight 10 is there shown in which the inserts 26 are positioned within a cylindrical mold cavity 40 of a mold 42 such that the outer surface 30 of the inserts 26 abuts against a cylindrical surface of the mold cavity 40. The mold cavity 40 is then filled with liquid metal, such as zinc, so that the liquid metal encapsulates the locking tabs and, upon solidification, forms the main body 12 and simultaneously secures the main body 12 to the inserts 26.

Figure 5:
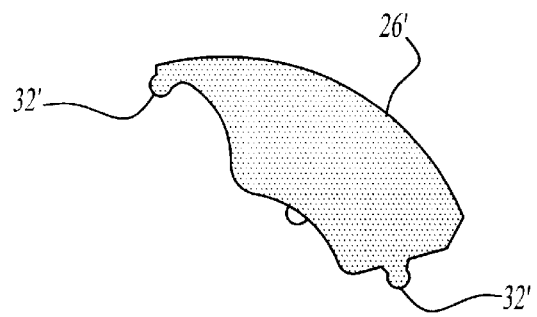
FIG. 5 is a side plan view illustrating a portion of a second preferred embodiment of the present invention.
Figure 6:
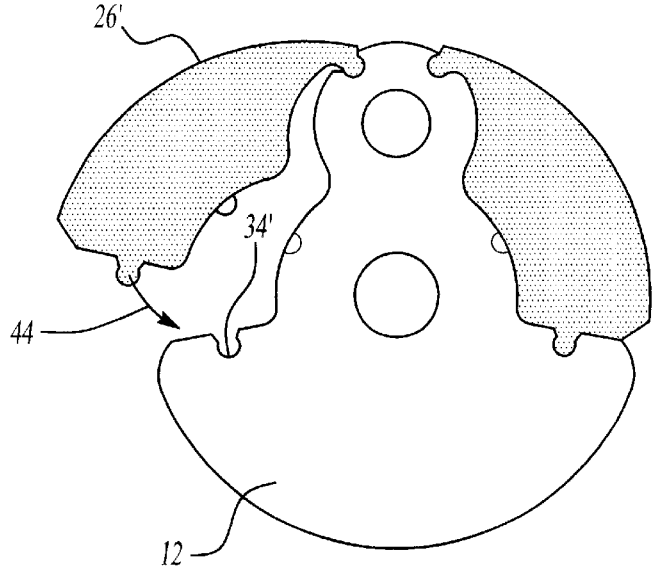
FIG. 6 is an exploded view illustrating a second preferred embodiment of the present invention.

With reference now to FIGS. 5 and 6, a still further embodiment of the present invention is there shown in which the inserts 26' include cylindrical shaped locking tabs 32'. These locking tabs 32' are dimensioned to be snap fit into like shaped locking recesses 34' formed on the counterweight main body. Thus, as shown by arrow 44, the counterweights 26' are secured to the main body 12 by pivoting the counterweights 26' about one end.

Figure 7:
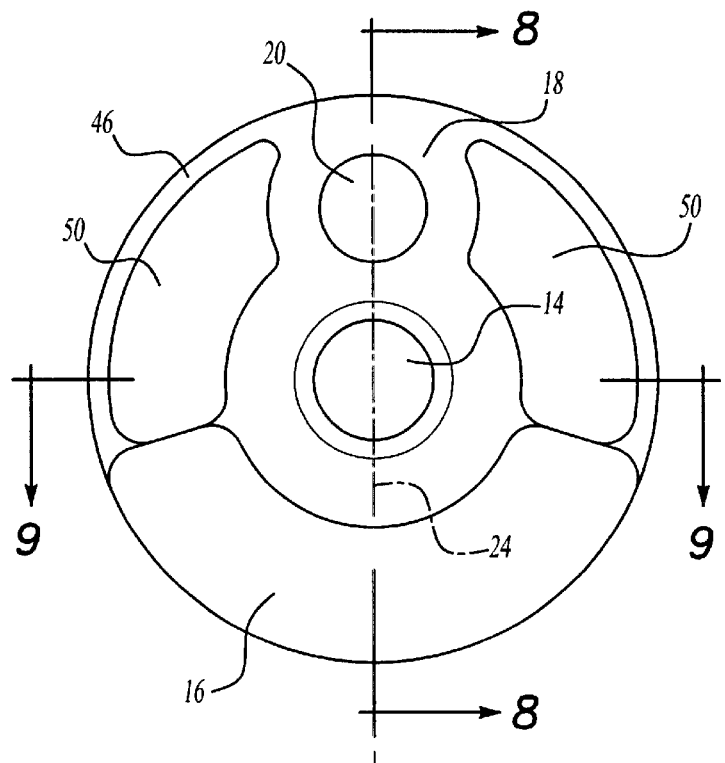
FIG. 7 is a front plan view illustrating yet a third preferred embodiment of the present invention.
Figure 8:
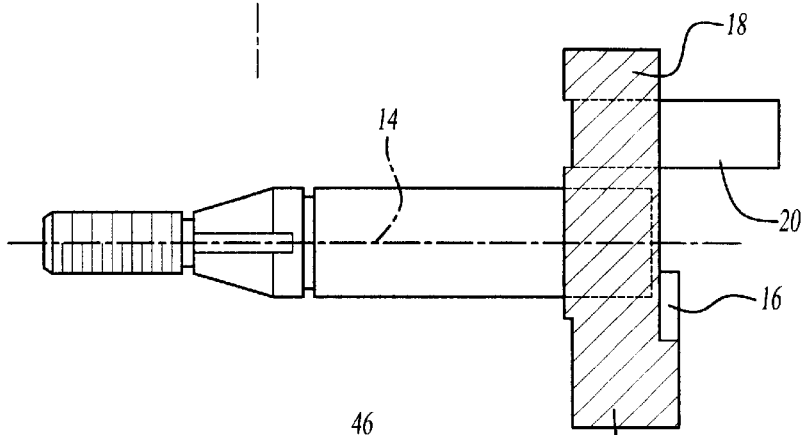
FIG. 8 is a cross-sectional view of the third preferred embodiment of the present invention taken along line 8—8 in FIG. 7.
Figure 9:
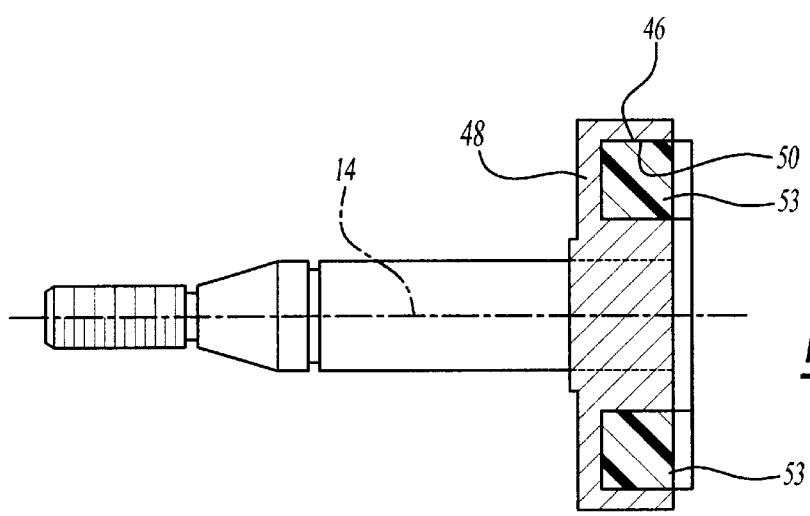
FIG. 9 is a cross-sectional view of the third preferred embodiment of the present invention taken along line 9—9 in FIG. 7.

With reference now to FIGS. 7, 8 and 9, yet another preferred embodiment of the present invention is there shown. In addition to a major lobe 16 and a minor lobe 18, the main body 12 also has an outer rim 46 and back wall 48 dimensioned so that the overall shape of the counterweight is circular. The rim 46 and back wall 48 are formed of the same material and are of a one-piece construction with the major lobe 14 and minor lobe 16.

The rim 46 and back wall 48 form two recesses 50, each bounded on all but one side by the major lobe 16, minor lobe 18, ring 46, and backing 48. One recess 50 is provided on each side of the diametric line 24 (FIG. 7) bisecting the major lobe 16 and minor lobe 18.

Plastic, or another suitable substance less dense than the metal of the main body 12, is then inserted into and fills the two recesses 50 by any conventional means. For example, liquid plastic can be poured or injected into the recesses 50 and allowed to solidify. Alternatively, plastic inserts 53 (FIG. 9) may be glued into the recesses 50.

From the foregoing, it can be seen that the present invention provides a simple, inexpensive and yet effective counterweight for an engine. Having described my invention, however, many modifications thereto will become apparent to those skilled in the art to which it pertains without deviation from the spirit of the invention as defined by the scope of the appended claims.

I claim:

1. A counterweight for a crankshaft comprising:

a main body adapted to rotate about a predetermined axis, said main body having a major lobe on one side of said axis of rotation and a diametrically opposed minor lobe, said major lobe having a greater volume than said minor lobe, a backing generally circular centered at said predetermined axis, and a ring circumscribing said backing and having a cylindrical shape having a constant radial distance from said predetermined axis;

said main body including two recesses, one recess being positioned on each opposite sides of a diametric line bisecting said major and minor lobes so that each recessed surface forms a portion of the outer periphery of both said major and minor lobes, said backing, and said ring;

a pair of inserts, each insert having surfaces complementary to that of one of said recesses;

wherein the density of said inserts is less than the density of said main body.

2. The invention as defined in claim 1 wherein said main body is constructed of metal.

3. The invention as defined in claim 2 wherein said inserts are constructed of plastic.

4. The invention as defined in claim 1 wherein, with said inserts attached to said main body, the counterweight is cylindrical in shape.

5. The invention as defined in claim 1 wherein said inserts are formed by causing liquid plastic to solidify in said recesses.

* * * * *